(12) United States Patent
Katsurabayashi

(10) Patent No.: US 7,830,555 B2
(45) Date of Patent: Nov. 9, 2010

(54) IMAGE FORMATION APPARATUS, IMAGE FORMING METHOD AND STORAGE MEDIUM FOR STORING PROGRAM

(75) Inventor: Hiroshi Katsurabayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1233 days.

(21) Appl. No.: 11/396,580

(22) Filed: Apr. 4, 2006

(65) Prior Publication Data

US 2007/0019245 A1     Jan. 25, 2007

(30) Foreign Application Priority Data

Jul. 19, 2005     (JP)   ............................ P2005-208476

(51) Int. Cl.
*H04N 1/40*     (2006.01)
(52) U.S. Cl. ...................... 358/3.28; 358/518; 382/162
(58) Field of Classification Search ................ 358/3.28, 358/518, 1.9; 347/86, 154; 382/100, 232, 382/210, 252, 287, 54, 162; 713/210, 287, 713/54; 386/94; 399/27
See application file for complete search history.

(56) References Cited

U.S. PATENT DOCUMENTS

| | | | |
|---|---|---|---|
| 6,164,760 A * | 12/2000 | Mizoguchi et al. ............ | 347/55 |
| 6,428,155 B1 * | 8/2002 | Silverbrook et al. .......... | 347/86 |
| 6,707,465 B2 * | 3/2004 | Yamazaki et al. ............ | 345/629 |
| 6,930,798 B1 * | 8/2005 | Kaneko ...................... | 358/1.9 |
| 2002/0070281 A1 | 6/2002 | Nimura et al. .............. | 235/494 |
| 2003/0036758 A1 * | 2/2003 | Frigg et al. .................... | 606/61 |
| 2003/0071726 A1 * | 4/2003 | Hopper et al. .............. | 340/540 |
| 2003/0077086 A1 | 4/2003 | Phillips ....................... | 399/24 |
| 2004/0036758 A1 * | 2/2004 | Sasaki et al. ................ | 347/154 |
| 2006/0209349 A1 * | 9/2006 | Tabata ....................... | 358/3.28 |

FOREIGN PATENT DOCUMENTS

| | | |
|---|---|---|
| JP | A-2001-157203 | 6/2001 |
| JP | A-2002-240387 | 8/2002 |
| JP | A-2003-200638 | 7/2003 |
| JP | 2004-94907 | 3/2004 |
| JP | 2004-528644 | 9/2004 |
| JP | A-2005-086410 | 3/2005 |

* cited by examiner

*Primary Examiner*—James A Thompson
(74) *Attorney, Agent, or Firm*—Morgan, Lewis & Bockius LLP

(57) ABSTRACT

An image formation apparatus includes a visible image data generation section that acquires content data of a print object and generates image data of a visible image containing the content, an invisible image data generation section that generates image data of a code image describing predetermined code information, the code image being an invisible image that can be hardly recognized by eyes of a human being, and a print image data generation section that generates print image data by superposing the invisible image data onto the visible image data, a part of the invisible image data being changed to be printed as a visible image.

14 Claims, 8 Drawing Sheets

CODE IMAGE

DOCUMENT IMAGE

PRINT IMAGE

IMAGE FORMATION APPARATUS, IMAGE FORMING METHOD AND STORAGE MEDIUM FOR STORING PROGRAM

CROSS-REFERENCE TO RELATED APPLICATION

The entire disclosure of Japanese Patent Application No. 2005-208476 filed on Jul. 19, 2005 including specification, claims, drawings, and abstract is incorporated herein by reference in its entirely.

BACKGROUND OF THE INVENTION

1. Field of the Invention

This invention relates to an image formation apparatus such as a copier or a printer and in particular to an image formation apparatus and an image forming method for superposing a usual image and an image formed using a special image formation material on each other for output.

2. Related Art

In recent years, attention has been focused on an art of using special paper with fine dots printed thereon (containing various sheet-like media) and inputting characters, an image, etc., handwritten on the paper by the user as electronic information (data). The input data is transferred to a personal computer, a mobile telephone, etc., and can be stored in a magnetic disk unit or any other storage or can be transmitted as electronic mail. In this art, small dots are printed on the special paper with a spacing of about 0.3 mm, for example, and the dots contained in a grid of a predetermined size draw a different pattern for each grid. The pattern can represent position information of an address, etc. Then, the pattern is read with a dedicated pen incorporating an optical read unit such as a digital camera, for example, whereby it is made possible to determine the position of the pen point and a move trace on the special paper. As information of the position of the pen point and the move trace is processed, it is made possible to use the handwritten characters and image on the paper as electronic information.

As this kind of related art, a large number of arts such as an art of printing a pattern on paper and an art of reading the pattern are proposed from various viewpoints. As the related art of forming a pattern on paper, for example, an art of providing a two-dimensional code pattern that can be printed with a document on demand using an existing office or home printer is available.

By the way, in the art of forming a code pattern representing the coordinates to determine a position on a plane on paper described above, generally an almost invisible colorant that cannot easily be identified by eyes of a human being is used to form a code pattern (for simplicity, the colorant to form the code pattern will be hereinafter referred to simply as "invisible" colorant). If a character, etc., is handwritten on paper where the code pattern is formed or if an image of an electronic document, etc., is superposed on the code pattern for print, the handwritten image or the image (which will be hereinafter collectively referred to as image) and the code pattern are visually recognized in a mixed manner and thus the invisible colorant is used to circumvent the difficulty of identifying the image.

The code pattern may be able to be read by a dedicated read unit as described above. Then, a code pattern is drawn using a colorant which allows a light beam in a visible light region to pass through and has a high absorption ratio of a light beam in any other region than the visible light (for example, near infrared region), and the read unit reads the code pattern using a light beam responsive to the nature of the colorant. Accordingly, it is made possible for the read unit to read while invisibility of the code pattern is ensured.

However, to form the code pattern using an invisible colorant as described above, it becomes difficult to determine whether or not the code pattern is formed simply by visual check on paper. Particularly, to print a code pattern using an image formation apparatus such as a printer, a situation in which the colorant (toner, etc.,) for the code pattern is insufficient and the code pattern cannot be printed although an image can be printed can occur. In such a case, if a human being sees printout paper, it is difficult for the human being to determine whether or not the code pattern is printed; this is a problem.

SUMMARY OF THE INVENTION

According to an aspect of the present invention, an image formation apparatus includes a visible image data generation section that acquires content data of a print object and generates image data of a visible image containing the content, an invisible image data generation section that generates image data of a code image describing predetermined code information, the code image being an invisible image that can be hardly recognized by eyes of a human being, and a print image data generation section that generates print image data by superposing the invisible image data onto the visible image data, a part of the invisible image data being changed to be printed as a visible image.

BRIEF DESCRIPTION OF THE DRAWINGS

Exemplary embodiment(s) of the present invention will be described in detail based on the following figures, wherein.

DETAILED DESCRIPTION

An exemplary embodiment will be discussed below in detail with reference to the accompanying drawings:

The exemplary embodiment is implemented as an image formation apparatus such as a copier or a printer. The image formation apparatus forms not only a visible image of a usual print object, but also an image of a code pattern to describe various pieces of information (code image) as an invisible image on a print medium such as paper. The invisible image cannot easily be identified by eyes of a human being, but can be recognized as light other than in a visible region is applied and reflected light is detected using a predetermined read device. For example, a near infrared ray having a wavelength of about 800 nm to 1000 nm can be used as light used to read the invisible image.

Figure 1:
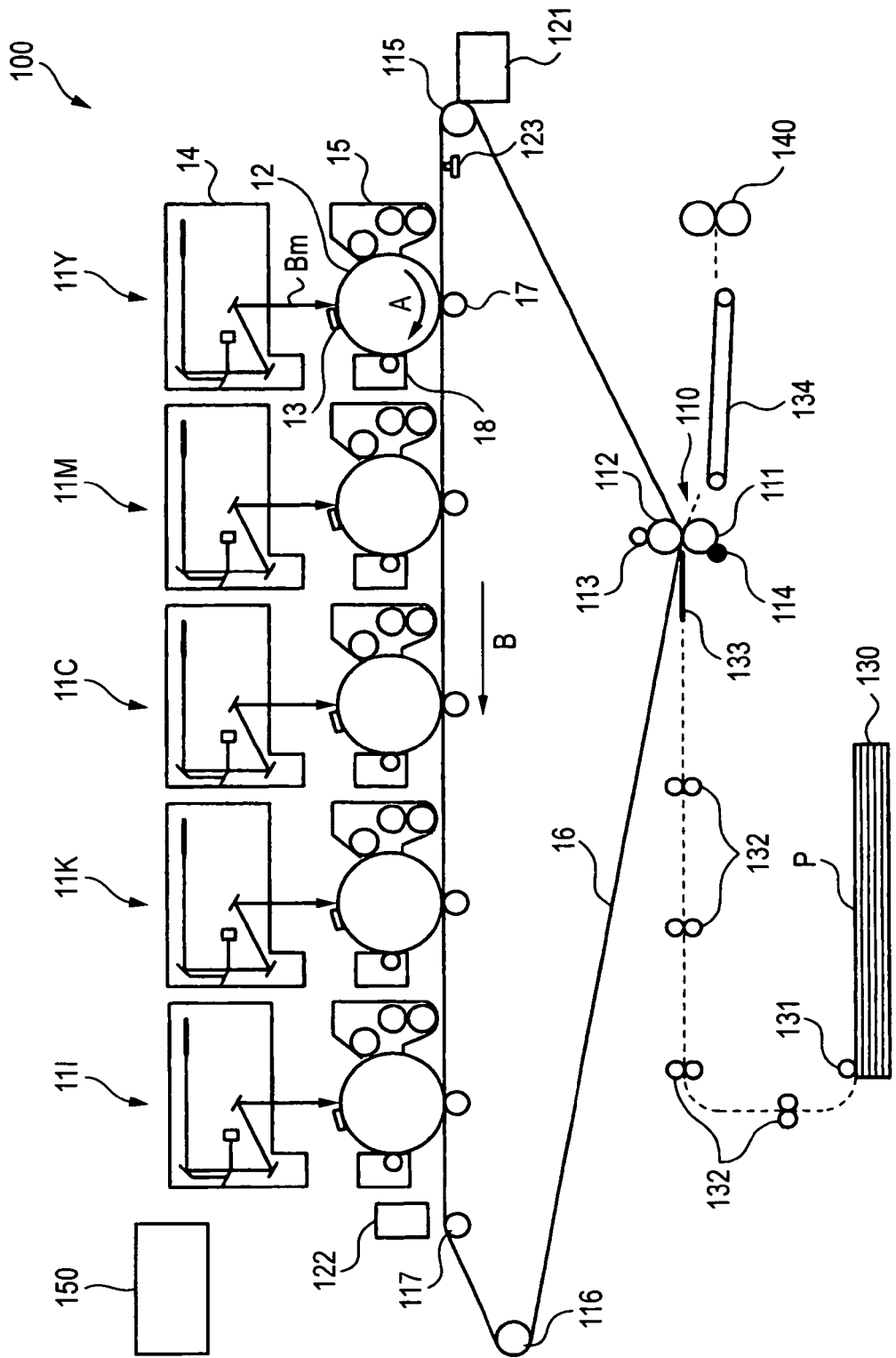
FIG. 1 is a drawing to show a configuration example of an image formation apparatus of an exemplary embodiment of the invention.

FIG. 1 is a drawing to show a configuration example of an image formation apparatus 100 of the exemplary embodiment.

The image formation apparatus 100 shown in FIG. 1 is a tandem apparatus; for example, it includes plural image formation units 11 (11Y, 11M, 11C, 11K, and 11I) for forming toner images of color components electrophotographically, an intermediate transfer belt 16 for transferring the color component toner images formed in the image formation units 11 in sequence (first transfer) and retaining the color component toner images, a secondary transfer unit 110 for transferring the overlap image transferred onto the intermediate transfer belt 16 onto paper (medium) P in batch (secondary transfer), and a fuser 140 for fixing the secondarily transferred image onto the paper P.

The image formation apparatus 100 is provided with the image formation unit 11K for forming a black (K) toner image and the image formation unit 11I for forming an invisible toner image as the image formation units forming the tandem as well as the image formation units 11Y, 11M, and 11C for forming toner images of yellow (Y), magenta (M), and cyan (C) of commonly used colors (usual colors). The toner composition is described later in detail.

In the exemplary embodiment, in each of the image formation units 11 (11Y, 11M, 11C, 11K, and 11I), disposed in sequence surrounding a photoreceptor drum 12 for rotating in the arrow A direction are electrophotographic devices such as a charger 13 for charging the photoreceptor drum 12, a laser exposure device 11 for writing an electrostatic latent image onto the photoreceptor drum 12 (in the figure, exposure beam is indicated by Bm), a developing device 15 in which the corresponding color component toner is stored for rendering the electrostatic latent image on the photoreceptor drum 12 as a visible image in toner, a first transfer roll 17 for transferring the color component toner images formed on the photoreceptor drum 12 onto the intermediate transfer belt 16, and a drum cleaner 18 for removing the remaining toner on the photoreceptor drum 12. The image formation units 11 are placed in the order of yellow (Y), magenta (M), cyan (C), black (K), and invisible (I) color upstream of the intermediate transfer belt 16.

The intermediate transfer belt 16 can be rotated in the arrow B direction shown in the figure by various rolls of a drive roll 115 for rotating the intermediate transfer belt 16 driven by a motor (not shown), a tension roller 116 having functions of giving constant tension to the intermediate transfer belt 16 and preventing the intermediate transfer belt 16 from meandering, an idle roll 117 for supporting the intermediate transfer belt 16, and a backup roller 112 (described later).

A voltage of the opposite polarity to the toner charge polarity is applied to the first transfer roll 17, whereby the toner images on the photoreceptor drum 12 are electrostatically attracted to the intermediate transfer belt 16 in order and an overlap toner image is formed on the intermediate transfer belt 16. Further, the secondary transfer unit 110 includes a secondary transfer roll 111 pressed against and placed on the toner image support side of the intermediate transfer belt 16 and a backup roller 112 placed on the back of the intermediate transfer belt 16 for forming a counter electrode of the secondary transfer roll 111. A metal feeding roll 113 to which a secondary transfer bias is stably supplied is abutted against and placed on the backup roller 112. A brush roll 114 for removing dirt deposited on the secondary transfer roll 111 is brought into contact with the secondary transfer roll 111.

A belt cleaner 121 for cleaning the surface of the intermediate transfer belt 16 after secondary transfer is provided downstream from the secondary transfer roll 111. On the other hand, an image density sensor 122 for adjusting the image quality is disposed upstream from the secondary transfer roll 111. Further, a reference sensor (home position sensor) 123 for generating a reference signal used as the reference to provide timing in the image formation units 11 is placed upstream from the Y image formation unit 11Y. The reference sensor 123 recognizes a predetermined mark put on the back of the intermediate transfer belt 16 and generates a reference signal, and the image formation units 11 start image formation according to an instruction from a control section 150 based on recognition of the reference signal.

Further, in the exemplary embodiment, a paper transport system includes a paper tray 130 for storing paper P, a pickup roller 131 for picking up and transporting paper P stacked on the paper tray 130 at a predetermined timing, a transport roll 132 for transporting the paper P paid out by the pickup roller 131, a transport chute 133 for feeding the paper P transported by the transport roll 132 into a secondary transfer position of the secondary transfer unit 110, and a transport belt 134 for transporting the paper P after secondary transfer to the fuser 110.

Next, the image formation process of the image formation apparatus 100 will be discussed. When the user turns on a start switch (not shown), a predetermined image formation process is executed. Specifically, for example, to implement the image formation apparatus 100 as a color printer, a digital image signal transmitted from a network is temporarily stored in memory and color toner images are formed based on the stored five-color (Y, M, C, K, and I) digital image signal.

First, the image formation units 11 (11Y, 11M, 11C, 11K, and 11I) are driven based on color image record signals provided by performing image processing. Each of the image formation units 11Y, 11M, 11C, 11K, and 11I writes an electrostatic latent image responsive to the corresponding image record signal by the laser exposure device 11 onto the photoreceptor drum 12 uniformly charged by the charger 13. The image formation unit develops the written electrostatic latent image by the developing device 15 in which the corresponding color toner is stored to form the toner image of the corresponding color.

The toner image formed on each photoreceptor drum 12 is first transferred from the photoreceptor drum 12 onto the surface of the intermediate transfer belt 16 according to a first transfer bias applied by the first transfer roll 17 at the first transfer position where the photoreceptor drum 12 and the intermediate transfer belt 16 are in contact with each other. The toner images thus first transferred onto the intermediate transfer belt 16 are overlapped on each other on the intermediate transfer belt 16 and are transported to the secondary transfer position with rotation of the intermediate transfer belt 16.

On the other hand, the paper P is transported to the secondary transfer position of the secondary transfer unit 110 at a predetermined timing and is nipped by the secondary transfer roll 111 and the intermediate transfer belt 16 (backup roll 112). The overlap toner image supported on the intermediate transfer belt 16 is secondarily transferred onto the paper P by the action of a secondary transfer electric field formed between the secondary transfer roll 111 and the backup roll 112.

Then, the paper P onto which the toner image is transferred is transported over the transport belt 134 to the fuser 140 for fixing the toner image. On the other hand, the intermediate transfer belt 16 after the secondary transfer has the remaining toner removed by the belt cleaner 121.

The configuration of the image formation apparatus 100 shown in FIG. 1 is only illustrative and may be any configuration if the apparatus can implement the functions provided by the exemplary embodiment described below.

Next, the functions of the image formation apparatus 100 in the exemplary embodiment will be discussed in detail.

Figure 2:
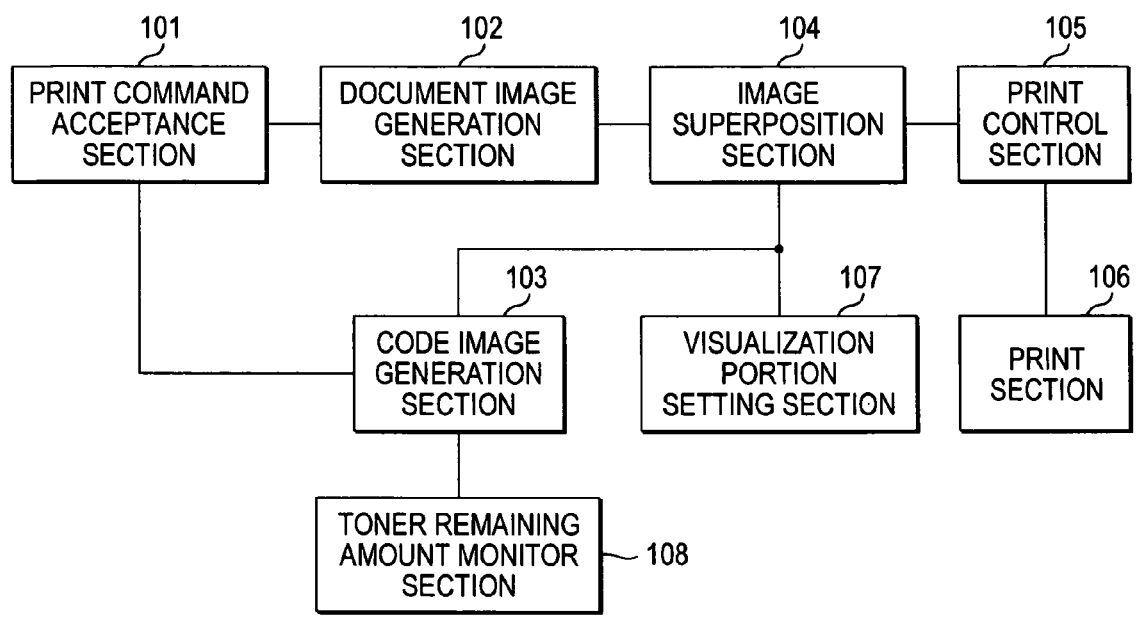
FIG. 2 is a block diagram to show the functional configuration of the image formation apparatus of the exemplary embodiment of the invention.

FIG. 2 is a block diagram to show the functional configuration of the image formation apparatus 100.

Referring to FIG. 2, the image formation apparatus 100 of the exemplary embodiment includes a print command acceptance section 101 for accepting an external image output command (print command), a document image generation section 102 for generating a print image based on the accepted print command, a code image generation section 103, and an image superposition section 104. It also includes a print control section 105 and a print section 106 for outputting the generated print image. The image formation apparatus 100 of the exemplary embodiment further includes a visualization portion setting section 107 for controlling processing of the image superposition section 104 and a toner remaining amount monitor section 108 for monitoring the remaining amount of invisible toner. The print section 106 is the image formation mechanism illustrated in FIG. 1 and other functions are implemented as a processor and storage (semiconductor memory, magnetic disk unit, etc.,) making up the control section 150 in FIG. 1. The processor operates in accordance with a program stored in the storage and implements the functions shown in FIG. 2. In the exemplary embodiment, the case where an electronic document is mainly to be printed (print object) will be discussed. The electronic document includes not only simple text data, but also image data of a photo image, etc., for example.

Upon acceptance of a print command, the print command acceptance section 101 extracts information concerning the document image of the electronic document to be printed from the print command and passes the information to the document image generation section 102. It also extracts information concerning a code image from the print command and passes the information to the code image generation section 103. The print command acceptance section 101 can accept a print command in various modes. For example, it can also accept a print command from a predetermined terminal (personal computer) through the network or may accept a print command entered by the user operating a console panel provided on the image formation apparatus 100. To accept a print command through the network, a LAN, an interface of RS-232, Centronics, etc., and various lines such as a telephone line can be used.

The print command can contain data of content to be printed of an electronic document, etc., to be printed (text, image, etc.,), margin setup information at the printing time on paper, the paper size, the number of pages of the electronic document to be printed in a sheet of paper, the scaling factor at the printing time, the number of copies, and code information (start address and end address of addresses used to identify a flat place, electronic document identification information, etc.,), for example. Information of the content data, the margin setup information, the paper size, the number of pages of the electronic document to be printed in a sheet of paper, the scaling factor, the number of copies, etc., is transferred to the document image generation section 102. Information of the paper size, the number of pages of the electronic document to be printed in a sheet of paper, the scaling factor, the number of copies, the code information, etc., is transferred to the code image generation section 103.

The document image generation section 102 acquires the content data of the print object (electronic document) and generates image data of a visible image (document image) based on the information received from the print command acceptance section 101. The content data can be acquired from the print command as described above. An exemplary embodiment can also be adopted wherein the print command is provided with information for identifying the data file of the print object and the document image generation section 102 acquires the data file of the print object identified by the information received from the print command acceptance section 101 from external storage. The document image is generated considering the information of the margin setup information, the paper size, the number of pages of the electronic document to be printed in a sheet of paper, the scaling factor, etc., extracted from the print command by the print command acceptance section 101.

The code image generation section 103 generates image data of an invisible image (code image) based on the information received from the print command acceptance section 101. In the code image, various pieces of information, such as the coordinates to determine the position on paper (address information), the medium ID for identifying the print medium (paper), the document ID for identifying the electronic document to be printed, the apparatus ID for identifying the printer (image formation apparatus), the print date and time, counter information (for example, the cumulative number of sheets of paper printed on the printer), can be described by a code pattern. A specific composition example of the code pattern is described later.

The image superposition section 104 combines the document image of the electronic document generated by the document image generation section 102 and the code image generated by the code image generation section 103 to generate image data of a print image. At this time, setting is made so that the code image is printed on a medium in invisible toner and the document image is printed on the medium in visible toner (Y, M, C, K). In the exemplary embodiment, however, a part of the code image is also printed in visible toner so that the user can also visually recognize that the code image is formed on the surface of a print medium. That is, a part of the code image is copied into the document image, whereby a visible code pattern appears in a part of the print image. The portion wherein the visible code pattern is to be printed is set by the visualization portion setting section 107. The processing of the image superposition section 104 and the visualization portion setting section 107 is described later in detail.

The print control section 105 acquires the print image generated by the image superposition section 104 and outputs the print image to the print section 106. At this time, the print control section 105 controls the print section 106 based on the information of the margin setup information, the paper size, the number of pages of the electronic document to be printed in a sheet of paper, the scaling factor, the number of copies, etc.

The print section 106 actually forms the image on the print medium under the control of the print control section 105.

The toner remaining amount monitor section 108 monitors the remaining amount of at least invisible toner using a sensor, for example.

Here, the toner used with the image formation apparatus 100 will be discussed in detail.

First, formerly used toners are used as Y toner used in the image formation unit 11Y, M toner used in the image formation unit 11M, and C toner used in the image formation unit 11C.

In contrast, in the exemplary embodiment, special toner is provided as K toner used in the image formation unit 11K. Since formerly used K toner (using carbon black as coloring material of black) absorbs infrared light, it is not appropriate to use the formerly used K toner to form a usual image in which no information is embedded in the system for reading information embedded using invisible toner by infrared light application. That is, in the exemplary embodiment, toner having an extremely low absorption ratio of infrared light and capable of printing black is adopted as K toner. As such toner, toner provided by mixing Y toner, M toner, and C toner is illustrated (usually, the colorants of yellow, magenta, and cyan less absorb the wavelength in the infrared region).

Although toner different in nature from the formerly used K toner is used, such special toner is also described as "K toner" for convenience in the Specification.

As invisible toner used in the image formation unit 11I, for example, it is possible to use toner containing the material described in JP-A-2003-186238, namely, containing binding resin and near infrared absorption material made of inorganic material particles.

As the binding resin, specifically polystyrene, styrene-alkyl acrylate copolymer, styrene-alkyl methacrylate copolymer, styrene-acrylonitrile copolymer, styrene-butadiene copolymer, styrene-maleic anhydride copolymer, polyethylene, polypropylene, etc., can be named.

Inorganic material particles containing at least $CuO$ and $P_2O_5$ can be used as the near infrared absorption material. Preferably, the density content of $CuO$ in invisible toner particles is in the range of 6% by mass to 35% by mass; more preferably in the range of 10% by mass to 30% by mass. Further, to provide uniform dispersibility of the inorganic material particles in the invisible toner and proper negative frictional electrification property required as record material for electrophotograph, preferably the inorganic material particles are made of copper phosphoric acid crystallized glass consisting essentially of $CuO$, $Al_2O_3$, $P_2O_5$, and $K_2O$. In the composition of the copper phosphoric acid crystallized glass, preferably $CuO$ is in the range of 20% by mass to 60% by mass, $Al_2O_3$ is in the range of 1% by mass to 10% by mass, $P_2O_5$ is in the range of 30% by mass to 70% by mass, and $K_2O$ is in the range of 1% by mass to 10% by mass.

Although described later in detail, the image formation apparatus 100 forms a code image using an invisible colorant much absorbing the wavelength in a specific infrared region as described above as the characteristic of the colorant. On the other hand, the image formation apparatus 100 forms an image such as a document image using a visible colorant less absorbing the wavelength in the infrared region. Accordingly, it is made possible to read the code image using light in the infrared region.

Next, the two-dimensional code image (code pattern) printed on the image formation apparatus 100 of the exemplary embodiment will be discussed taking specific pattern examples.

FIG. 3(A) to FIG. 3(D) are drawings to describe a composition example of a two-dimensional code image used in the exemplary embodiment. FIG. 3(A) is a drawing represented like a lattice to schematically show the units of a two-dimensional code image formed of an invisible image and placed. FIG. 3(B) is a drawing to show one unit of the two-dimensional code image whose invisible image is recognized by infrared light application. FIGS. 3(C) and (D) are drawings to describe slanting line patterns of a backslash "\" and a slash "/."

The two-dimensional code image formed in the image formation apparatus 100 is formed of invisible toner with the maximum absorption rate in a visible light region (400 nm to 700 nm) being 7% or less, for example, and the absorption rate in a near infrared region (800 nm to 1000 nm) being 30% or more, for example. The invisible toner with an average dispersion diameter ranging from 100 nm to 600 nm is adopted to enhance the near infrared light absorption capability required for mechanical read of an image.

The two-dimensional code image shown in FIG. 3(A) to FIG. 3(D) is formed as an invisible image for which mechanical read by infrared light application and decoding processing can be performed stably over a long term and information can be recorded at a high density. Preferably, the two-dimensional code image is an invisible image that can be provided in any desired area regardless of whether or not the area is an area where a visible image on the medium surface for outputting an image is provided. In the exemplary embodiment, the invisible image is formed on a full face of one side of a medium (paper face) matched with the size of a printed medium. However, the expression "full face" is not used to mean the full face containing all four corners of paper. With an apparatus such as an electrophotographic apparatus, usually the margins of the paper face are often in an unprintable range. Therefore, an invisible image is not printed in the range.

Figure 3:
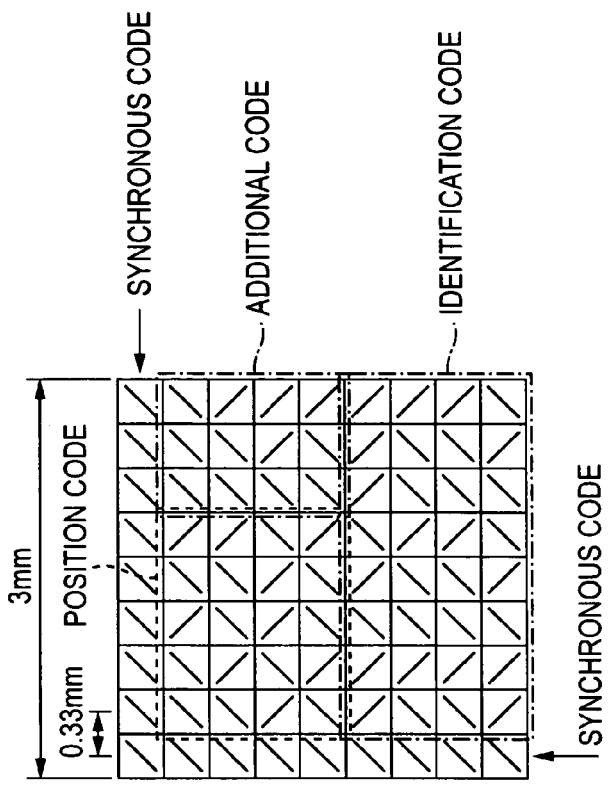
FIGS. 3(A) to (D) are drawings to describe a composition example of a two-dimensional code image used in the exemplary embodiment of the invention.
Figure 3:
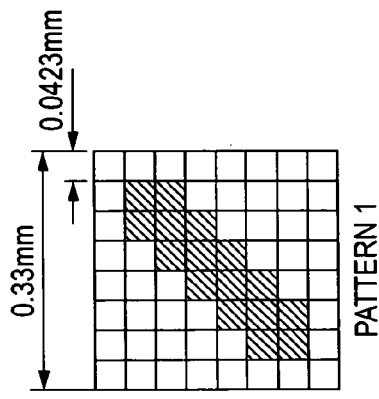
Figure 3:
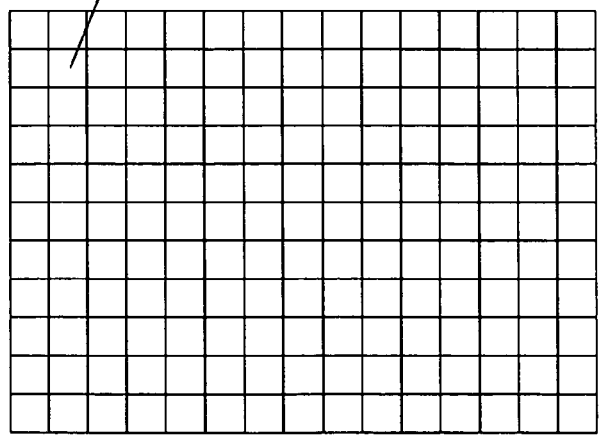
Figure 3:
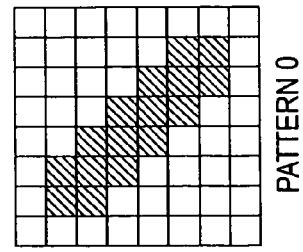

The two-dimensional code pattern shown in FIG. 3 (B) contains an area to store a position code indicating the coordinate position on the medium, an area to store an identification code for uniquely identifying the electronic document or the print medium, and an area to store an additional code used in a user application. It also contains an area to store a synchronous code. As shown in FIG. 3(A), the two-dimensional code patterns are placed and two-dimensional codes storing different pieces of position information are placed like a lattice on the full face of one side of the medium (paper face) matched with the size of the printed medium. That is, plural two-dimensional code patterns as shown in FIG. 3(B) are placed on one side of the medium, each including a position code, an additional code, an identification code, and a synchronous code. Different pieces of position information are stored in the areas of the position codes depending on the place where the position code is placed. On the other hand, the same identification information and the same additional information are stored in the identification code areas and the additional code areas independently of the place where the code is placed.

25-bit (=5 bits×5 bits) position information is stored in the position code area shown in FIG. 3(B). When each slanting line pattern is formed of 8×8 pixels (600 dpi) as shown in FIGS. 3(C) and (D), the size of the two-dimensional code (containing the synchronous code) in FIG. 3(B) becomes about 3 mm in length and about 3 mm in width (8 pixels×9 bits×0.0423 mm) because one dot of 600 dpi is 0.0423 mm.

The identification code is placed in a 3-bit×8-bit rectangular area and 24-bit identification information can be stored.

The additional code is placed in a 5-bit×3-bit rectangular area and 15-bit additional information can be stored.

In the example shown in FIGS. 3(C) and (D), the two slanting line patterns differ in angle 90 degrees, but if the angle difference is set to 45 degrees, four types of slanting line patterns can be formed. In doing so, one slanting line pattern can represent 2-bit information (any of 0 to 3). That is, as the number of angle types of slanting line patterns is increased, the number of bits that can be represented can be increased.

In the example shown in FIGS. 3(C) and (D), coding of the bit values is described using the slanting line patterns, but the patterns that can be selected are not limited to the slanting line patterns. A coding method of dot ON/OFF or a coding method depending on the direction in which the dot position is shifted from the reference position can also be adopted.

The two-dimensional code image used in the exemplary embodiment has been described. The code pattern shown in FIGS. 3(A) to (D) is only illustrative and various code patterns other than the code pattern can be used. For example, a black circle ● rather than the slanting line pattern as shown in FIGS. 3(B), (C) or (D) may be drawn as a dot and information (0, 1) may be represented according to the size of the black circle. A virtual raster pattern shaped like a lattice can be assumed, a dot such as a black circle ● can be drawn at a position shifted a given distance with respect to the raster position, and information can be represented according to the shift direction of the dot relative to the raster position (for example, 0 to 3 (two bits) if the dot position is shifted up and down and from side to side).

Figure 4:
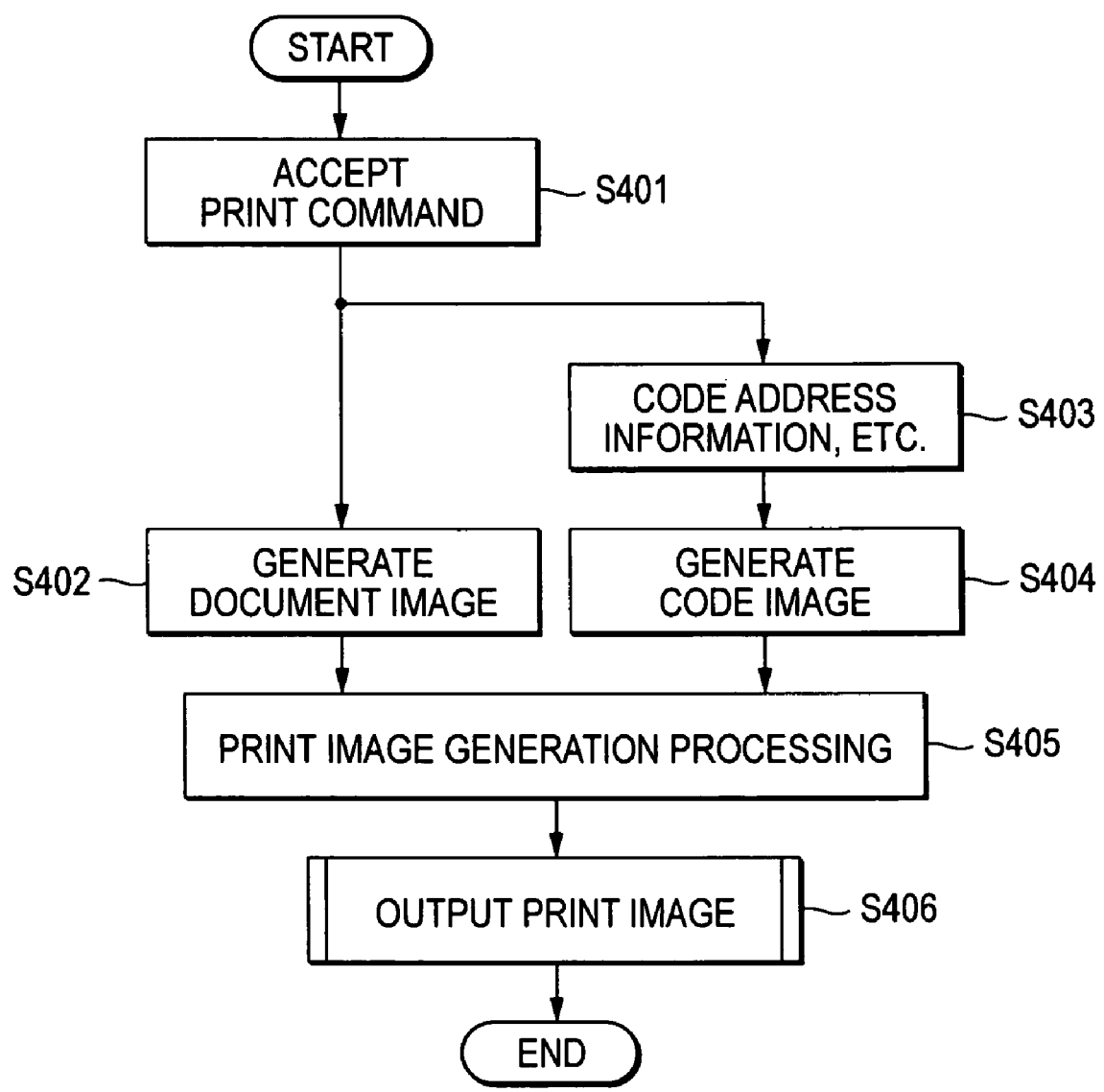
FIG. 4 is a flowchart to show the general flow of image output processing by the image formation apparatus of the exemplary embodiment of the invention.

Next, the operation of the image formation apparatus 100 of the exemplary embodiment described above is as follows:

FIG. 4 is a flowchart to show the general flow of image output processing by the image formation apparatus of the exemplary embodiment.

Referring to FIG. 4, first, a print command is accepted by the print command acceptance section 101 of the image formation apparatus 100 and necessary information is sent to the document image generation section 102 and the code image generation section 103 (step 401). A document image of a visible image is generated in the document image generation section 102 (step 402).

On the other hand, in the code image generation section 103, consecutive address information to print on one side of a medium is generated conforming to the size of the print medium based on the information received from the print command acceptance section 101 and is coded together with the electronic document, the identification information of the print medium, etc., (step 403). A code image describing the coded medium identification information and the coded address information is generated (step 404).

Next, the image superposition section 104 performs print image generation processing (step 405) and superposes the document image generated at step 402 and the code image generated at step 404 on each other to generate a print image. The print control section 105 controls the print section 106 to print the print image generated by the image superposition section 104 (step 406).

Figure 5:
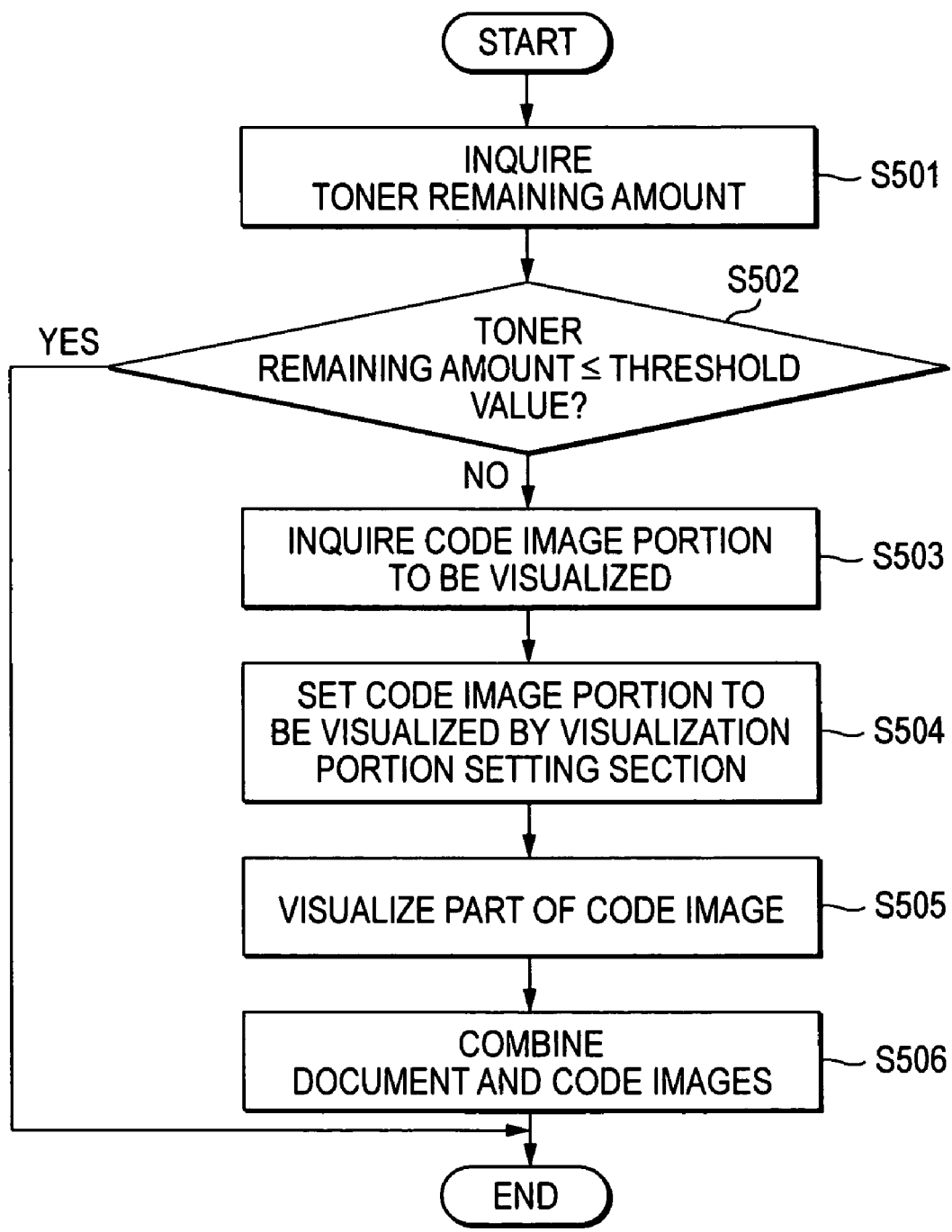
FIG. 5 is a flowchart to show the details of print image generation processing in FIG. 4.

FIG. 5 is a flowchart to show the details of the print image generation processing shown in FIG. 4.

In the exemplary embodiment, a part of the code image which is essentially an invisible image is also formed on a print medium as a visible image, as described above, so as to enable the user to visually recognize that a code image is formed on the print medium surface according to the presence or absence of a visible code pattern.

By the way, the image formation apparatus 100 stores visible toner for forming a visible image and invisible toner for forming a code image of an invisible image. If the remaining amount of the invisible toner is insufficient, a code image cannot be formed regardless of the description of a print command, of course. In this case, if a part of the code image is formed as a visible image, a contradictory situation can occur wherein although the visible code pattern exists on the medium, actually a code image is not formed in invisible toner (namely, the read device cannot read the information).

Then, the image superposition section 104 first inquires of the toner remaining amount monitor section 108 the remaining amount of invisible toner (step S501). If the obtained remaining amount of invisible toner becomes equal to or less than a given amount defined as a predetermined threshold value, the processing is terminated without superposing the document image and the code image (step 502). In this case, the print control section 105 may output only the document image of a visible image to the print section 106 or can also cancel the print processing. If the remaining amount of the invisible toner becomes equal to or less than the threshold value, first, code image generation processing may be canceled in the code image generation section 103 and then image superposition processing may be canceled in the code image generation section 103 provided that code image generation processing is canceled.

On the other hand, if the remaining amount of the invisible toner is larger than the threshold value, then the image superposition section 104 inquires of the visualization portion setting section 107 which portion of the code image generated by the code image generation section 103 is to be visualized (steps 502 and 503).

The visualization portion setting section 107 selects the portion of the code image to be visualized in response to the inquiry made by the image superposition section 104 and notifies the image superposition section 104 of the code image portion to be visualized (step 504). The part to visually form the code image on the surface of the print medium needs to be set so as not to degrade the visibility of the document image of the essential visible image. Therefore, preferably the portion to visually form the code image is set in a corner of the medium surface or at the position corresponding to the header part or the footer part of the document image. The visualization portion can also be set automatically using any algorithm or any position desired by the user can also be set as the user operates the console panel provided on the image formation apparatus 100. To automatically set the visualization portion with the predetermined algorithm, the information of the margin setup information, the paper size, the number of pages of the electronic document to be printed in a sheet of paper, the scaling factor, etc., extracted from the print command is considered. When the image superposition section 104 inquires of the visualization portion setting section 107, the image superposition section 104 passes the information pieces to the visualization portion setting section 107.

Next, the image superposition section 104 visualizes a part of the code image (the portion selected at step 504) based on the setting of the visualization portion setting section 107 (step 505). Specifically, the code pattern of the portion set as the visualization portion is copied from the code image and is inserted into the visual image. With the image formation apparatus 100 shown in FIG. 1, the visible image first is generated and is managed as a four-color image of Y, M, C, and K. The color image formation units 11 (11Y, 11M, 11C, and 11K) transfer images onto the intermediate transfer belt 16 in order and the color images are overlapped, whereby a visible image of any desired tint is generated. In such a case, the code pattern of the visualization portion may be inserted into the image of any desired color of the four colors of Y, M, C, and K. For example, if the code pattern is inserted into the cyan (C) image, a single-color (cyan) code pattern is formed on the output print image.

After the processing is performed, the image superposition section 104 combines the document image containing the code pattern generated and visualized as the color visible image and the code image generated as the invisible image to generate a print image, and sends the print image to the print control section 105 (step 506).

Figure 6:
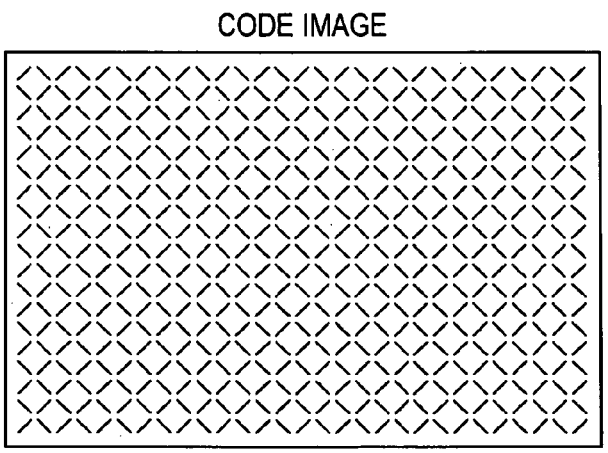
FIGS. 6(A) to (C) are drawings to show examples oaf document image, a code image, and a print image generated according to the exemplary embodiment of the invention.
Figure 6:
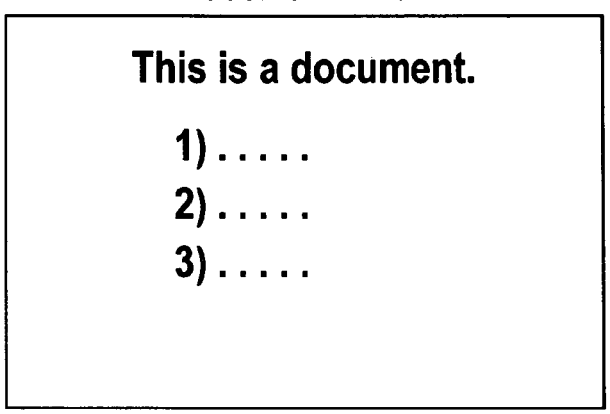
Figure 6:
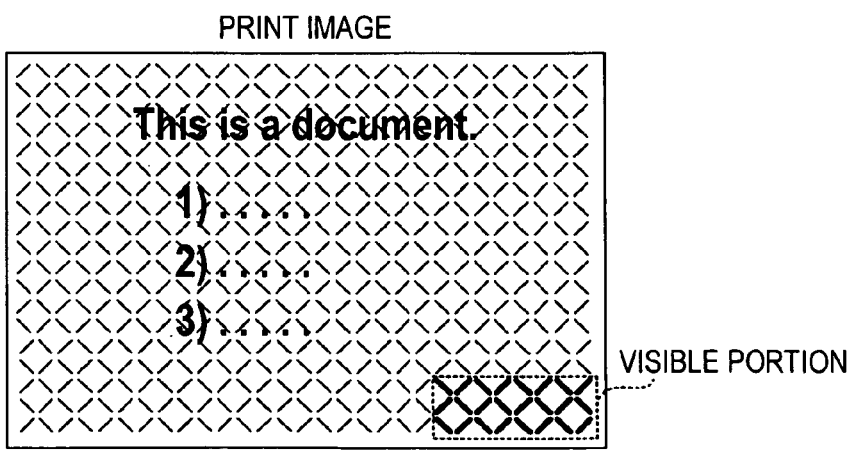

FIGS. 6(A) to (C) are drawings to show examples of a document image, a code image, and a print image generated according to the exemplary embodiment.

FIG. 6(A) shows a code image and FIG. 6(B) shows a document image. The images are superposed and a part of the code image (lower right portion) is visibly formed (in the figure, the thick line portion surrounded by the dashed line) to generate a print image shown in FIG. 6(C).

In the operation example described above, to visualize apart of the code image, the code pattern of the visualization portion is copied from the code image and is inserted into the visible image. Therefore, the visualized code pattern can be visually recognized as a visible image and is also formed as an invisible image and can also be read by a read device. In contrast, the code pattern of the visualization portion can also be cut out from the code image and be inserted into a visible image. In this case, the visualized code pattern can be visually recognized as a visible image, but cannot be read by a read device. However, the visualization portion of the code pattern is set in a corner of a print medium or in the header part, the footer part, etc., of the document image so as not to degrade the visibility of the document image of the essential visible image as described above and thus the code pattern of the visualization portion is not used to read the image position in the document image. If the visualization area is taken sufficiently small, it is considered that the effect is also small when the move trace of the pen point of the read device is read in input of a handwritten image, etc. Therefore, if the code pattern cannot be read through the read device only in the visualization portion, there is no hindrance to acquisition of the code information.

An exemplary embodiment is also possible wherein the image formation apparatus 100 is provided with special visible toner for forming a visible code pattern and forms the code pattern of the visualization portion in the special visible toner. In the system of the exemplary embodiment, the code image formed in invisible toner is read by infrared light application and thus visible toner absorbing no infrared light is used as described above. Particularly, usually used toner using carbon black as colorant is not used as black toner. Then, for example, the toner using carbon black as colorant can be used as toner to form a visible code pattern. In so doing, when a visible code pattern is formed, if the code pattern is cut out from the code image, it is made possible to read the code pattern formed in the toner using carbon black as colorant through the read device.

In this case, the toner using carbon black as colorant is used as the K toner used in the image formation unit 11K and is used only to form a visible code pattern. A mixture of Y toner, M toner, and C toner rather than K toner is used as black for forming a visible image (document image) in which information is not embedded. As the K toner and the mixture of Y toner, M toner, and C toner are properly used according to the purpose, the code pattern formed in black can be read through the read device and black indication other than the code pattern is not recognized by the read device by mistake.

In the operation example described above, the code pattern acquired from the code image is inserted into the visible image, but the gradation of the code pattern may be inverted for inserting the code pattern into the visible image. In so doing, the visible code pattern can be drawn as a watermark-like image and the visibility of the visible code pattern can be enhanced.

The size and the shape of the visualization portion of the code pattern may be as desired; however, preferably the visualization portion is of a small size to such an extent that it does not become difficult to visually recognize the visualization portion not to hinder recognition of the document image and read of the code image. The shape can be not only a simple shape such as a rectangle, but also a predetermined log shape.

Next, the code image read device will be discussed.

Figure 7:
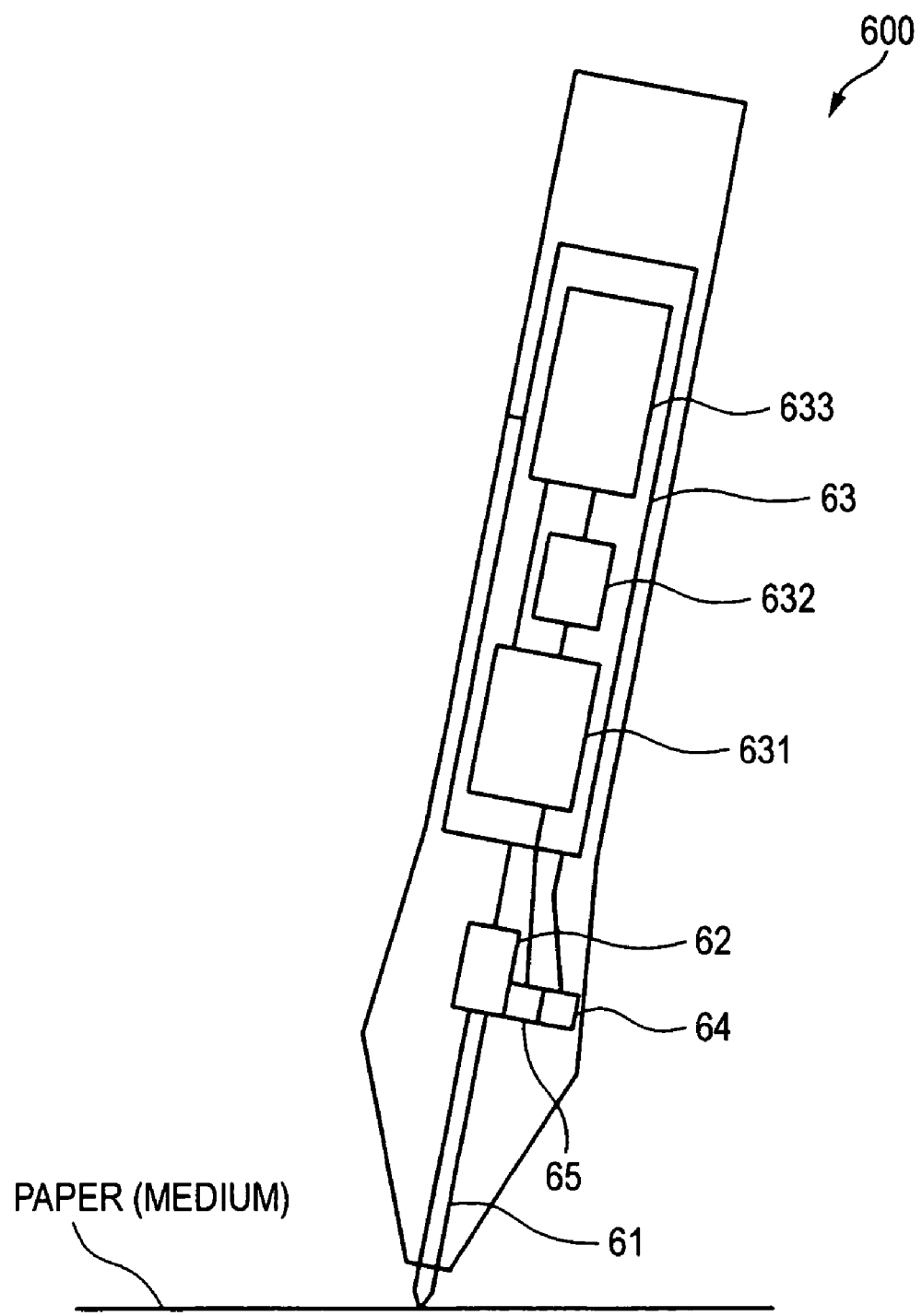
FIG. 7 is a drawing to show a configuration example of a pen device for reading a code image formed according to the exemplary embodiment of the invention.

Various types of a pen device, a scanner device, etc., are possible as the code image read device. However, a handy read device of a pen device, etc., needs to be used to recognize the move trace of the read device on a print medium from the code image read result and input a handwritten image. Then, the pen read device (simply pen device) will be discussed below:

FIG. 7 is a drawing to show a configuration example of a pen device 600 in the exemplary embodiment.

The pen device 600 includes a writing section 61 for recording text and a graphic form by similar operation to that of a usual pen on paper (medium) on which a code image and a document image are printed in combination, and a tool force detection section 62 for monitoring motion of the writing section 61 and detecting the pen device 600 pressed against paper. The pen device 600 also includes a control section 63 for controlling the whole electronic operation of the pen device 600, an infrared application section 64 for applying infrared light for reading a code image on paper, and an image input section 65 for recognizing and inputting the code image by receiving the reflected infrared light.

The control section 63 includes a code acquisition section 631, a trace calculation section 632, and an information storage section 633. The code acquisition section 631 is a section for analyzing the image input from the image input section 65 and acquiring code. The trace calculation section 632 is a section for correcting the shift between the coordinates of the pen point of the writing section 61 and the coordinates of the image captured by the image input section 65 for the code acquired by the code acquisition section 631 and calculating the trace of the pen point. The information storage section 633 is a section for storing the code acquired by the code acquisition section 631 and the trace information calculated by the trace calculation section 632.

Figure 8:
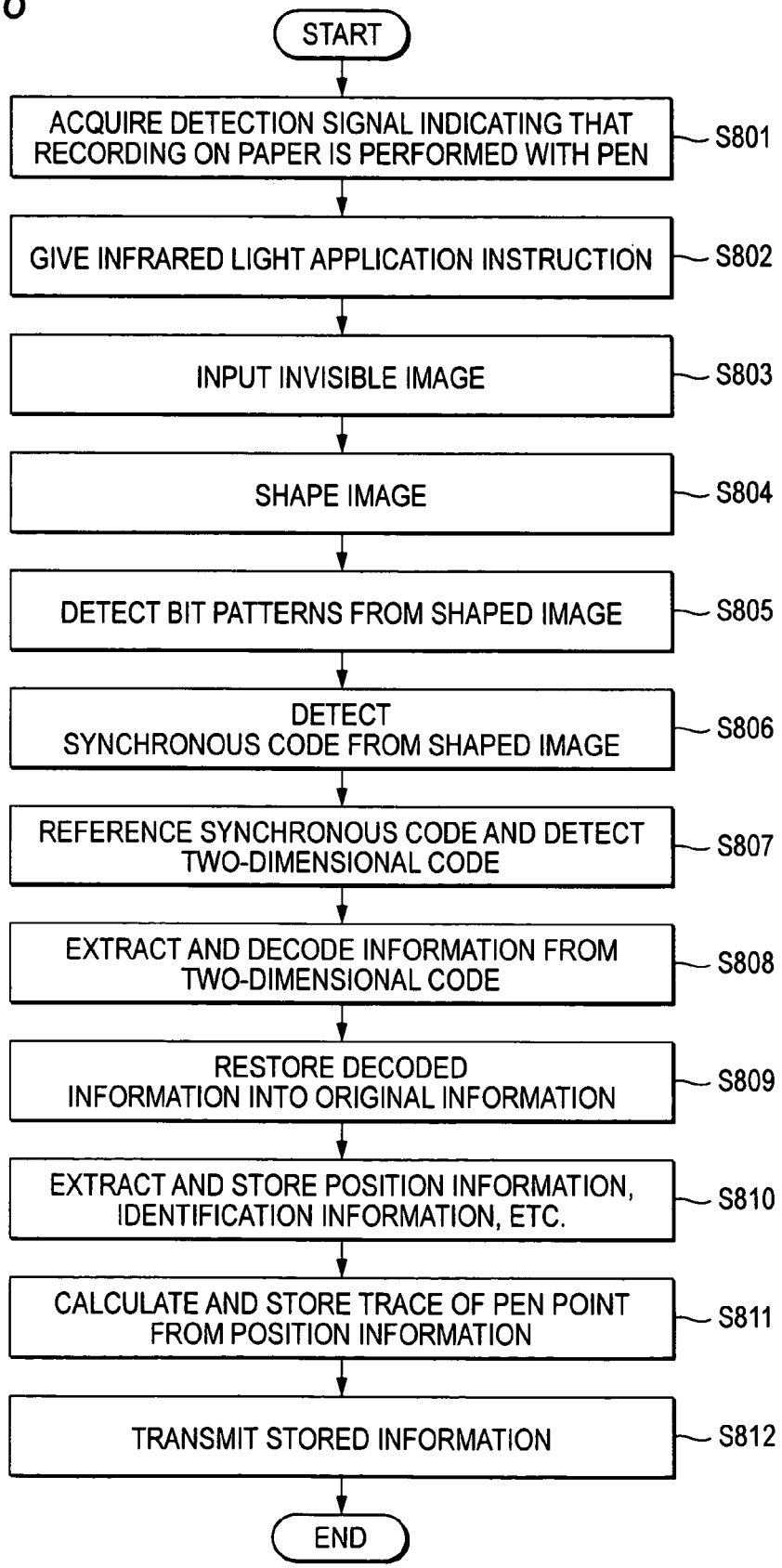
FIG. 8 is a flowchart to show processing executed mainly by a control section of the pen device shown in FIG. 7.

FIG. 8 is a flowchart to show processing executed mainly by the control section 63 of the pen device 600.

When text or a graphic form is recorded on paper, for example, using the pen device 600, the control section 63 acquires a detection signal indicating that recording on paper is performed using the pen from the tool force detection section 62 (step 801). Upon reception of the detection signal, the control section 63 instructs the infrared application section 64 to apply infrared light onto paper (step 802). The infrared light applied onto paper by the infrared application section 64 is absorbed in an invisible image and is reflected on other portions. The image input section 65 receives the reflected infrared light and recognizes the portion where the infrared light is not reflected as a code image. The control section 63 inputs (scans) the code image from the image input section 65 (step 803).

Next, the code acquisition section 631 of the control section 63 executes code image detection processing shown t steps 804 to 810. First, the code acquisition section 631 shapes the input scan image (step 804). The scan image shaping includes inclination correction, noise removal, etc. Bit patterns (slanting line patterns) of slash "/" backslash "\" etc., are detected from the shaped scan image (step 805). On the other hand, a synchronous code of a two-dimensional code positioning code is detected from the shaped scan image (step 806). The code acquisition section 631 references the synchronous code position and detects a two-dimensional code (step 807). Then, it extracts and decodes information of ECC (Error Correction Code), etc., from the two-dimensional code (step 808). The code acquisition section 631 restores the decoded information into the original information (step 809).

The code acquisition section 631 of the control section 63 extracts position information, identification information, and additional information from the code information thus provided and stores the extracted information in the information storage section 633 (step 810). On the other hand, the trace calculation section 632 calculates the trace of the pen point from the position information stored in the information storage section 633 and stores the trace in the information storage section 633 (step 811). The stored information of the identification information, the additional information, the trace information, etc., in the information storage section 633 is transmitted in a wireless or wired manner to a terminal (personal computer) provided for processing the information read with the pen device 600, for example, (step 812).

The terminal can access a document management server for managing electronic documents based on the received information and acquire information of the electronic document printed on the print medium read with the pen device 600. The terminal can superpose the image read with the pen device 600 on the image of the acquired electronic document for display on a display.

As described above, in the exemplary embodiment, a part of the code image generated as an invisible image is formed on a print medium as a visible image, whereby it is made possible for the user to easily visually check whether or not a code pattern is formed on a print medium on which an image is printed on the image formation apparatus of the exemplary embodiment.

In the exemplary embodiment, the image formation apparatus having the print mechanism is provided with all of the function of generating the document image of a visible image, the function of generating the code image of an invisible image, and the function of superposing the images on each other and visualizing a part of the code image to generate a print image. However, the system can also be configured as an image formation system wherein an additional server machine including all or some of the functions is provided and the image data of a print image generated by the server is transferred to an apparatus having a print mechanism for output.

Further, another aspect of the present invention can be an image forming method including acquiring content data of a print object and generating image data of a visible image containing the content, generating image data of a code image describing predetermined code information, the code image being an invisible image that can be hardly recognized by eyes of a human being, generating print image data by superposing the invisible image data onto the visible image data, a part of the invisible image data being changed to be printed as a visible image, and printing an image based on the print image data on the print medium using a colorant.

Further, according to another aspect of the present invention, there is provided a storage medium readable by a computer, which stores a program of instructions executable by the computer provided in an image formation apparatus. The medium may be a magnetic disk, an optical disk, semiconductor memory, or any other medium or network for distribution.

Though the embodiments of the present invention have been described above, the invention is not limited to the above embodiments, but various changes may be made thereto without departing from the scope or spirit of the invention as defined in the claims.

What is claimed is:

1. An image formation apparatus comprising:
    a visible image data generation portion that acquires content data of a print object and generating image data of a visible image containing the content;
    an invisible image data generation portion that generates image data of a code image describing predetermined code information, the code image being an invisible image that can be hardly recognized by eyes of a human being;
    a print image data generation portion that generates print image data by superposing the invisible image data onto the visible image data, a part of the invisible image data being changed to be printed as a visible image; and
    a colorant remaining amount monitor portion that monitors the remaining amount of a colorant in an image formation unit, the colorant including a colorant for the visible image and a colorant for the invisible image,
    wherein if the remaining amount of the colorant for the invisible image detected by the colorant remaining amount monitor portion becomes equal to or less than a given amount, said print image data generation portion does not superpose the invisible image data onto the visible image data and adopts the visible image data intact as the print image data.

2. The image formation apparatus as claimed in claim 1, wherein said print image data generation portion copies a part of the invisible image data generated by said invisible image data generation portion and inserts the part into the visible image data generated by said visible image data generation portion.

3. The image formation apparatus as claimed in claim 1, wherein said print image data generation portion cuts off a part from the invisible image data generated by said invisible image data generation portion and inserts the part into the visible image data generated by said visible image data generation portion.

4. An image formation apparatus comprising:
    a visible image data generation portion that acquires content data of a print object and generating image data of a visible image containing the content;
    an invisible image data generation portion that generates image data of a code image describing predetermined code information, the code image being an invisible image that can be hardly recognized by eyes of a human being;
    a print image data generation portion that generates print image data by superposing the invisible image data onto the visible image data, a part of the invisible image data being changed to be printed as a visible image; and
    a colorant remaining amount monitor portion that monitors the remaining amount of a colorant in an image formation unit, the colorant including a colorant for the visible image and a colorant for the invisible image,
    wherein if the remaining amount of the colorant for the invisible image detected by the colorant remaining amount monitor portion becomes equal to or less than a given amount, said print image data generation portion cancels generation of the print image data.

5. An image formation apparatus comprising:
    a visible image data generation portion that acquires content data of a print object and generating image data of a visible image containing the content;

an invisible image data generation portion that generates image data of a code image describing predetermined code information, the code image being an invisible image that can be hardly recognized by eyes of a human being;

a print image data generation portion that generates print image data by superposing the invisible image data onto the visible image data, a part of the invisible image data being changed to be printed as a visible image; and a colorant remaining amount monitor portion that monitors the remaining amount of a colorant in an image formation unit, the colorant including a colorant for the visible image and a colorant for the invisible image, wherein if the remaining amount of the colorant for the invisible image detected by the colorant remaining amount monitor portion becomes equal to or less than a given amount, said invisible image data generation portion cancels generation of the invisible image data, and said print image data generation portion adopts the visible image intact as the print image data.

6. An image formation apparatus comprising:

a print section that forms an image on a print medium using a colorant; and a control section that controls said print section to form an image based on predetermined image data, the control section including:

a visible image data generation portion that acquires content data of a print object and generating image data of a visible image containing the content;

an invisible image data generation portion that generates image data of a code image describing predetermined code information, the code image being an invisible image that can be hardly recognized by eyes of a human being;

a print image data generation portion that generates print image data by superposing the invisible image data onto the visible image data, a part of the invisible image data being changed to be printed as a visible image; and a colorant remaining amount monitor portion that monitors the remaining amount of a colorant in an image formation unit, the colorant including a colorant for the visible image and a colorant for the invisible image, wherein if the remaining amount of the colorant for the invisible image detected by the colorant remaining amount monitor portion becomes equal to or less than a given amount, said print image data generation portion does not superpose the invisible image data onto the visible image data and adopts the visible image data intact as the print image data; and wherein the print section comprises:

a first image formation unit that forms the visible image using a colorant for the visible image absorbing little specific light outside a visible region; and a second image formation unit that forms the invisible image using a colorant for the invisible image absorbing much of the specific light.

7. The image formation apparatus as claimed in claim 6, further comprising:

a third image formation unit that forms the visible image based on the part of the invisible image data changed by said print image data generation portion of said control section using the colorant for the visible image absorbing much of the specific light.

8. An image formation apparatus comprising:

a code image data generation portion that generates image data of a code image describing predetermined code information;

a print image data generation portion that generates print image data with a part of the code image as a visible image; and a print portion that forms the part of the code image set as the visible image on a print medium using a colorant for a visible image and other parts of the code image on the print medium using a colorant for an invisible image that can be hardly recognized by eyes of a human being based on the print image data generated by said print image data generation portion, wherein said code image data generation portion monitors the colorant remaining amount in an image formation unit, and if the remaining amount of the colorant for the invisible image becomes equal to or less than a given amount, said print image data generation portion cancels generation of the code image.

9. An image forming method comprising:

acquiring content data of a print object and generating image data of a visible image containing the content;

generating image data of a code image describing predetermined code information, the code image being an invisible image that can be hardly recognized by eyes of a human being;

generating print image data by superposing the invisible image data onto the visible image data, a part of the invisible image data being changed to be printed as a visible image; and printing an image based on the print image data on the print medium using a colorant, wherein the remaining amount of a colorant in an image formation unit is monitored in the step of generating the print image data, and if the remaining amount of the colorant for the invisible image becomes equal to or less than a given amount, the invisible image data is not superimposed onto the visible image data and the visible image data is adopted intact as the print image data.

10. An image forming method comprising:

acquiring content data of a print object and generating image data of a visible image containing the content;

generating image data of a code image describing predetermined code information, the code image being an invisible image that can be hardly recognized by eyes of a human being;

generating print image data by superposing the invisible image data onto the visible image data, a part of the invisible image data being changed to be printed as a visible image; and printing an image based on the print image data on the print medium using a colorant, wherein the remaining amount of a colorant in an image formation unit is monitored in the step of generating the print image data, and if the remaining amount of the colorant for the invisible image becomes equal to or less than a given amount, generation of the print image data is canceled.

11. An image forming method comprising:

acquiring content data of a print object and generating image data of a visible image containing the content;

generating image data of a code image describing predetermined code information, the code image being an invisible image that can be hardly recognized by eyes of a human being;

generating print image data by superposing the invisible image data onto the visible image data, a part of the invisible image data being changed to be printed as a visible image; and printing an image based on the print image data on the print medium using a colorant, wherein the remaining amount of a colorant in an image formation unit is monitored in said step of generating the invisible image data, and if the remaining amount of the colorant for the invisible image becomes equal to or less than a given amount, generation of the invisible image data is canceled, and generation of the print image data is canceled.

12. A storage medium readable by a computer, the storage medium storing a program of instructions executable by the computer provided in an image formation apparatus, the instructions comprising:

acquiring content data of a print object and generating image data of a visible image containing the content;

generating image data of a code image describing predetermined code information, the code image being an invisible image that can be hardly recognized by eyes of a human being; and generating print image data by superposing the invisible image data onto the visible image data, a part of the invisible image data being changed to be printed as a visible image, wherein a remaining amount of a colorant for the invisible image in an image formation unit is monitored in generating the print image data, and wherein, if the remaining amount becomes equal to or less than a given amount, the invisible image data is not superimposed onto the visible image data and the visible image data is adopted intact as the print image data.

13. A storage medium readable by a computer, the storage medium storing a program of instructions executable by the computer provided in an image formation apparatus, the instructions comprising:

acquiring content data of a print object and generating image data of a visible image containing the content;

generating image data of a code image describing predetermined code information, the code image being an invisible image that can be hardly recognized by eyes of a human being; and generating print image data by superposing the invisible image data onto the visible image data, a part of the invisible image data being changed to be printed as a visible image, wherein a remaining amount of a colorant for the invisible image in an image formation unit is monitored in generating the print image data, and wherein, if the remaining amount becomes equal to or less than a given amount, generation of the print image data is canceled.

14. A storage medium readable by a computer, the storage medium storing a program of instructions executable by the computer provided in an image formation apparatus, the instructions comprising:

acquiring content data of a print object and generating image data of a visible image containing the content;

generating image data of a code image describing predetermined code information, the code image being an invisible image that can be hardly recognized by eyes of a human being; and generating print image data by superposing the invisible image data onto the visible image data, a part of the invisible image data being changed to be printed as a visible image, wherein a remaining amount of a colorant for the invisible image in an image formation unit is monitored in generating the print image data, and wherein, if the remaining amount becomes equal to or less than a given amount, generation of the invisible image data is canceled, and generation of the print image data is canceled.

* * * * *